(12) United States Patent
Choi

(10) Patent No.: US 7,735,862 B2
(45) Date of Patent: Jun. 15, 2010

(54) AIRBAG CUSHION FOLDING METHOD FOR OUT-OF-POSITION CONDITIONS

(75) Inventor: Changsoo Choi, Rochester, MI (US)

(73) Assignee: Autoliv ASP, Inc, Ogden, UT (US)

( * ) Notice: Subject to any disclaimer, the term of this patent is extended or adjusted under 35 U.S.C. 154(b) by 275 days.

(21) Appl. No.: 11/804,146

(22) Filed: May 16, 2007

(65) Prior Publication Data
US 2008/0284140 A1 Nov. 20, 2008

(51) Int. Cl.
*B60R 21/16* (2006.01)
(52) U.S. Cl. .............. 280/743.1; 280/731; 280/732
(58) Field of Classification Search ........... 280/743.1, 280/730.1, 730.2, 731, 732
See application file for complete search history.

(56) References Cited

U.S. PATENT DOCUMENTS

| | | | | |
|---|---|---|---|---|
| 4,235,453 A * | 11/1980 | Lawson et al. | ............ | 280/743.1 |
| 5,425,551 A * | 6/1995 | Hawthorn | ............... | 280/743.1 |
| 5,492,367 A * | 2/1996 | Albright et al. | ........... | 280/743.1 |
| 5,531,477 A * | 7/1996 | Madrigal et al. | ......... | 280/743.1 |
| 5,538,281 A * | 7/1996 | Patercsak | .................. | 280/743.1 |
| 5,957,486 A * | 9/1999 | Taguchi et al. | .............. | 280/729 |
| 6,196,585 B1 * | 3/2001 | Igawa | ...................... | 280/743.1 |
| 6,286,866 B1 | 9/2001 | Satge et al. | .............. | 280/743.1 |
| 6,398,258 B2 | 6/2002 | Hamada et al. | .......... | 280/743.1 |
| 6,499,765 B2 | 12/2002 | Hawthorn et al. | ........ | 280/743.1 |
| 6,767,030 B2 * | 7/2004 | Yamaji et al. | ............... | 280/740 |
| 6,945,562 B2 * | 9/2005 | Abe | ........................ | 280/743.1 |
| 6,988,743 B2 * | 1/2006 | Okamoto et al. | ......... | 280/743.1 |
| 7,223,224 B2 * | 5/2007 | Card et al. | .................. | 493/458 |
| 7,232,153 B2 * | 6/2007 | Kawauchimaru et al. | . | 280/743.1 |
| 7,404,570 B2 * | 7/2008 | Miyata | .................... | 280/728.2 |

* cited by examiner

*Primary Examiner*—Toan C To
(74) *Attorney, Agent, or Firm*—Sally J Brown; Stoel Rives LLP

(57) ABSTRACT

Disclosed are embodiments of methods of folding an inflatable airbag cushion for storage within a vehicle. In one implementation of the inventive method, the folding of the airbag cushion creates a first arm and a second arm, the first arm folded on top of the second arm, such that during deployment of the airbag cushion with an obstruction, the first arm is configured to contact an obstruction before completely unfolding and thereby at least partially biasing the deployment of the airbag cushion.

17 Claims, 2 Drawing Sheets

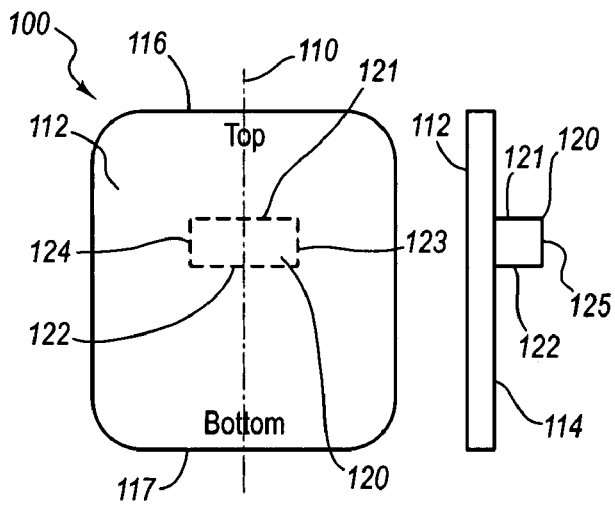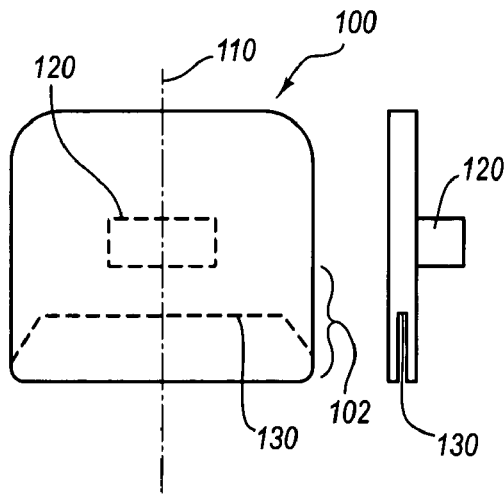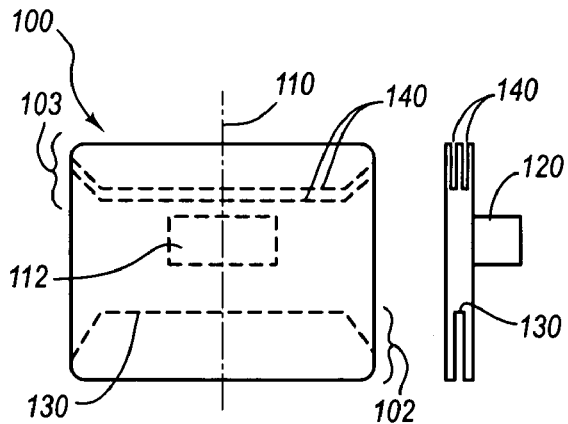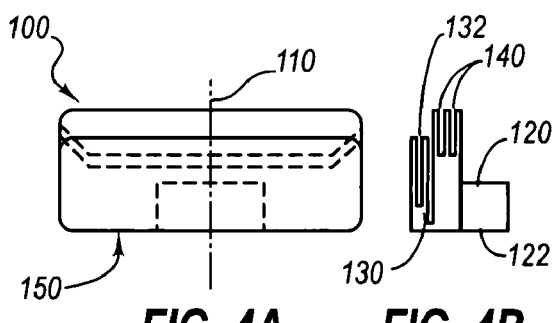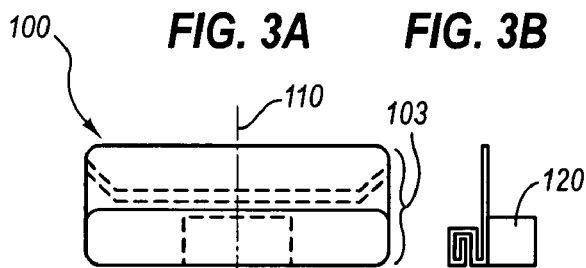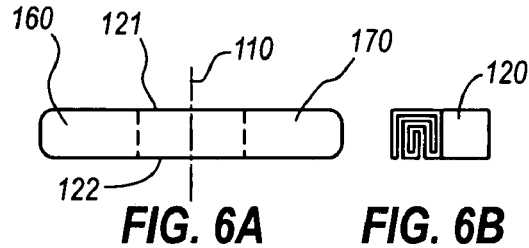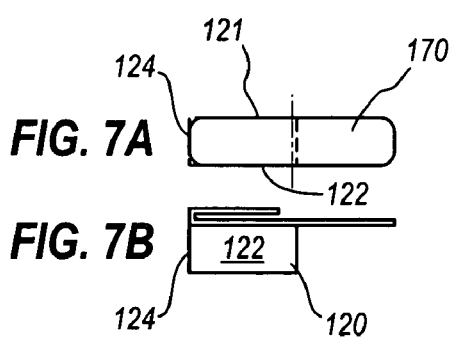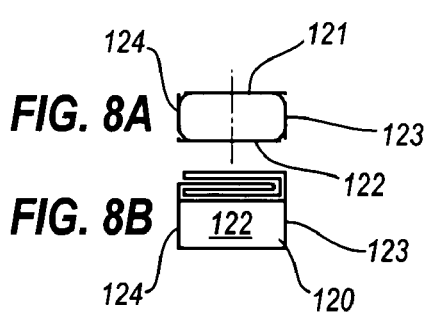

AIRBAG CUSHION FOLDING METHOD FOR OUT-OF-POSITION CONDITIONS

TECHNICAL FIELD

The present disclosure relates generally to the field of motor vehicle occupant protective systems. More specifically, the present disclosure relates to methods for folding passenger airbags.

BRIEF DESCRIPTION OF THE DRAWINGS

Understanding that drawings depict only typical embodiments of the invention and are not therefore to be considered to be limiting of its scope, the invention will be described and explained with specificity and detail through the use of the accompanying drawings as listed below.

FIG. 1A is a view of the front side of an inflatable airbag in a flat unfolded state showing a top edge and a bottom edge.

FIG. 1B is a cross sectional view of the inflatable airbag from FIG. 1A along the longitudinal centerline of the inflatable airbag.

FIG. 2A is a view an inflatable airbag similar to FIG. 1A showing the bottom edged tucked inwardly between the front side and the underside of the inflatable airbag.

FIG. 2B is a cross sectional view of the inflatable airbag from FIG. 2A along the longitudinal centerline of the inflatable airbag.

FIG. 3A is a view similar to FIG. 2A wherein the top edge of the inflatable airbag is tucked inwardly between the front side and the underside.

FIG. 3B is a cross sectional view of the inflatable airbag from FIG. 3A along the longitudinal centerline of the airbag cushion.

FIG. 4A is a is a view similar to FIG. 3A wherein a bottom portion of the inflatable airbag is folded along a fold line.

FIG. 4B is a cross sectional view of the inflatable airbag from FIG. 4A along the longitudinal centerline of the airbag cushion.

FIG. 5A is a view similar to FIG. 4A wherein the bottom portion of the inflatable airbag is further folded or rolled.

FIG. 5B is a cross sectional view along the longitudinal centerline of the inflatable airbag of FIG. 5A.

FIG. 6A is a is a view similar to FIG. 5A wherein a top portion of the inflatable airbag is folded or rolled over the bottom portion.

FIG. 6B is a cross sectional view along the longitudinal centerline of the inflatable airbag of FIG. 6A.

FIG. 7A is a is a view similar to FIG. 6A and including folding a first arm inwardly toward the longitudinal centerline of the inflatable airbag.

FIG. 7B is a cross sectional view along the longitudinal centerline of the inflatable airbag of FIG. 7A.

FIG. 8A is a is a view similar to FIG. 7A but showing a second arm folded inwardly on top of the first folded arm.

FIG. 8B is a cross sectional view along the longitudinal centerline of the airbag cushion of FIG. 8A.

Figure 9A:
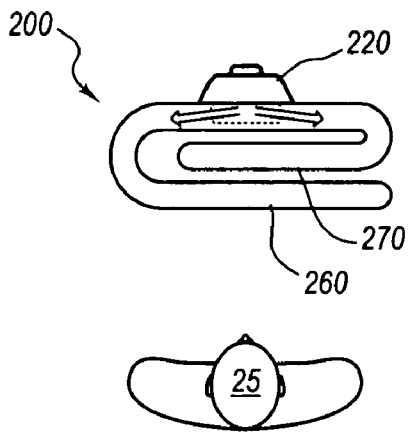
FIG. 9A is a top view of a inflatable airbag, folded according to the present invention.

INDEX OF ELEMENTS IDENTIFIED IN THE DRAWINGS 25 vehicle occupant
100 inflatable airbag
102 bottom portion
103 top portion
110 longitudinal center line
112 front side layer
114 underside layer
116 top edge
117 bottom edge
120 housing
121 top boundary
122 bottom boundary
123 outboard boundary
124 inboard boundary
125 floor
130 tuck
132 edges of the tuck
140 tuck
160 first arm
170 second arm
200 airbag cushion
220 housing
260 first arm
270 second arm
280 gas deflector

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the invention, as claimed, but is merely representative of various embodiments. While the various aspects of the embodiments are presented in the drawings, the drawings are not necessarily drawn to scale unless specifically indicated.

As those of skill in the art will appreciate, the principles of the invention may be applied to and used with a variety of vehicle airbag systems including frontal driver and passenger airbags, knee airbags, overhead airbags, curtain airbags, and the like. Thus, the present invention is applicable to airbag cushions of various shapes and sizes.

Full inflation of an airbag is not always desired. For example, partial inflation offers optimal protection when the occupant being protected by the airbag cushion is a child, a baby in a rear facing car seat or an adult positioned too close to the airbag cushion. Such conditions are referred to as out-of-position conditions. Embodiments described below provide methods of folding an airbag cushion including folded arms laid against each other at the final fold sequence that are configured to respond to an occupant's position to avoid excessive deploying impact. A gas deflector, such as a loop diffuser, may also be positioned in the cushion to detour the flow of gas during airbag deployment. It is desirable to include a gas deflector in the cushion due to the ability of a gas deflector to decrease punch-out loading and disperse the energy of the inflation gas during out-of-position conditions.

FIGS. 1A and 1B show an inflatable airbag 100 in an unfolded state. The inflatable airbag 100 may include a gas deflector, such as a loop diffuser, to direct the gas flow during deployment. The inflatable airbag 100 may include a longitudinal center line 110 and a front side layer 112 configured to face a vehicle occupant during deployment and an underside layer 114 which may be contiguous with or connected to the front side layer 112. In one embodiment, the inflatable airbag 100 may also include a top edge 116 and a bottom edge 117, both generally transverse to the longitudinal center line 110. When installed and inflated in a vehicle, the top edge 116 would be disposed generally towards the roof of the vehicle and the bottom edge 117 would be disposed generally towards the floor of the vehicle. As shown in FIGS. 1A and 1B, the dimensions of the inflatable airbag 100 may be generally rectangular in shape. In yet another embodiment, the inflatable airbag 100 may be of any desired shape such as circular, trapezoidal, organic, etc.

The inflatable airbag 100 may be configured to be attached to a housing, such as housing 120, in which the inflatable airbag 100 may be stored prior to inflation. In one embodiment, the housing 120 may be generally rectangular shaped with a top boundary 121, a bottom boundary 122, an outboard boundary 123, an inboard boundary 124, and a floor 125. However, the housing need not have a rectangular cross section as does housing 120 in the accompanying figures. Thus, the term "boundary" is intended to encompass portions of the housing that may not be straight. In one implementation of a method according to the invention, the inflatable airbag 100 is folded and/or rolled to a size that may fit within the boundaries of the housing 120.

Referring to FIG. 2A and FIG. 2B, during the folding process according to one embodiment of the invention, the bottom edge 117 may be tucked inwardly between the front side layer 112 and the underside layer 114 forming at least one invagination or tuck, such as tuck 130, in the bottom portion 102 of the inflatable airbag 100. The one or more tucks extending general transverse to the longitudinal centerline 110. In one embodiment according to the invention, the bottom edge 117 may be tucked inwardly several times to form multiple tucks in the bottom portion 102 of the inflatable airbag 100. Similarly, as shown by FIGS. 3A and 3B, the top edge 116 may be tucked inwardly at least once to form one or more invaginations or tucks, such as tuck 140. The tuck 140, extending generally transverse to the longitudinal centerline 110.

With reference to FIGS. 4A and 4B, the bottom portion 102 may or may not include one or more tucks and may be folded up and over towards the top portion 103 of the inflatable airbag 100. More particularly, as shown by FIG. 4B, the bottom portion 102 may include tuck 130 and can be folded up along a fold line substantially aligned with the bottom boundary 122 of the housing 120. By way of example only, if the outer edges 132 of the bottom portion 102 extend beyond the top boundary 121 of the housing 120, as shown by FIG. 4B, the folded bottom portion 102 may be folded or rolled again back on itself as shown in FIGS. 5A and 5B.

The top portion 103, as illustrated in FIGS. 6A and 6B, may be folded or rolled down towards the bottom portion 102 along a fold line substantially aligned with the top boundary 121 of the housing 120. In one implementation of a method according to the invention, the top portion 103 may be folded over the folded bottom portion 102, or the bottom portion 102 may be folded or rolled over the top portion 103, such that the dimensions of the folded bottom portion 102 and the folded top portion 103 may generally align with the top boundary 121 and the bottom boundary 122 of the housing 120 and forming a first arm 160 and a second arm 170.

In another embodiment of the invention, the top edge 116 and/or the bottom edge 117, may be tucked inwardly to create multiple tucks. The outer edges of the stacked tucks of the top portion 103 and the bottom portion 102 may generally be even with both the top boundary 121 and the bottom boundary 122 of the housing 120.

With continued reference to FIGS. 6A and 6B, the first arm 160 and the second arm 170 may extend generally transverse to the longitudinal center line 110 of the inflatable airbag 100. In one embodiment, the first arm 160 and the second arm 170 may both comprise the folded and/or rolled top portion 103 and the folded and/or rolled bottom portion 102 of the inflatable airbag 100 and may extend generally beyond both the inboard boundary 124 and the outboard boundary 123 of the housing 120.

With reference to FIGS. 7A-8B, after the formation of the first arm 160 and the second arm 170, the first arm 160 and the second arm 170 may be folded inwardly generally toward the direction of the longitudinal center line 110. The first arm 160 and second arm 170 may be folded along fold lines generally even with the inboard boundary 124 and the outboard boundary 123 of the housing 120. More particularly, the first arm 160 may be folded inwardly and then the second arm 170 may be folded inwardly and positioned over the first arm 160. In yet another embodiment, the second arm 170 may be folded inwardly and the first arm 160 may then be folded inwardly and disposed over the second arm 170.

Figure 9C:
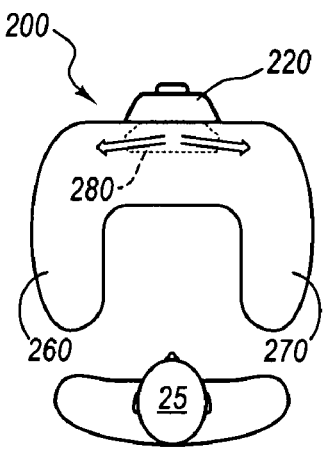
FIGS. 9C and 9D show a fully deployed inflatable airbag without obstruction, the gas deflector shown in phantom.
Figure 9D:
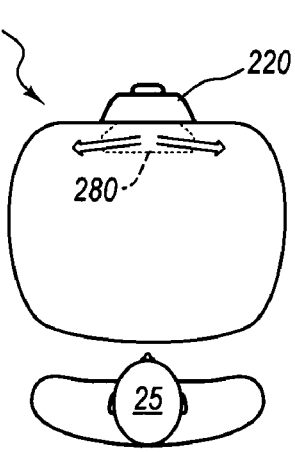

FIGS. 9A-D illustrate various stages of a deploying airbag cushion 200 without obstruction in the deploying path. As an example only, and not meant as a limitation, FIGS. 9C and 9D illustrate different embodiments of the airbag cushion 200 which may be shaped according to the constraints of the vehicle in which it may be used. The airbag cushion 200 may be attached to the housing 220 and may include a gas deflector 280. The gas deflectors disclosed herein are examples of means for diffusing gas by re-directing inflation gas from an inflator when deployment of the airbag is obstructed. The embodiment of the gas deflector 280 shown in FIGS. 9A-10A is pentagon shaped and comprises a material which may be integral with a surface of the airbag cushion 200 or attached to the airbag cushion 200. For example, the gas deflector 280 may be sewn together with the cushion. In other embodiments, the gas deflector may have other shapes. For example, the gas deflector may be rectangular, trapezoidal, hexagonal, round, etc. It may also have a portion which is round or elliptical while other portions are angled.

In the non-deployed state, and during the first stages of deployment, the airbag cushion 200 may be folded as described previously, including a first arm 260 that is folded over a second arm 270. In another embodiment, the second arm 270 may be folded over the first arm 260. In FIG. 9A, the initial breakout of the airbag cushion 200 occurs. Because airbag cushion 200 is initially in a folded condition, at initial breakout (such as the initial milliseconds), the first arm 260 and the second arm 270 are folded on each other. If an occupant is properly positioned in front of the airbag cushion 200, the first arm 260 and the second arm 270 unfold without any obstruction and the airbag cushion 200 fully deploys and is allowed to pressurize normally. More particularly, as shown in FIGS. 9C and 9D, when the occupant 25 is in a normal seating position which will allow the airbag cushion 200 to fully expand before impacting the occupant, the occupant 25 benefits from the full restraint capability of the airbag cushion 200.

Figure 10A:
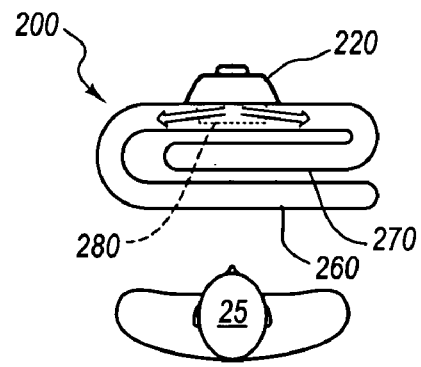
FIG. 10A is a top view of a inflatable airbag, folded according to the present invention, and an out-of-position occupant.
Figure 9B:
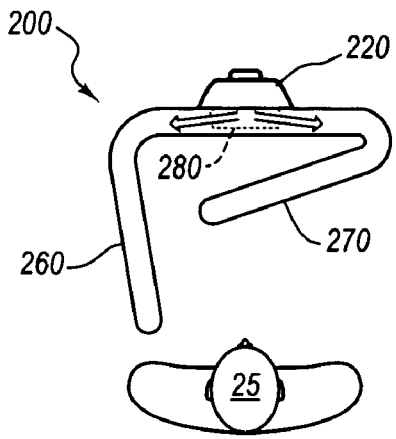
FIG. 9B shows a partially deployed inflatable airbag without obstruction.
Figure 10B:
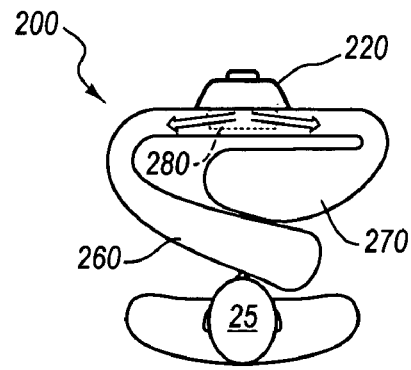
FIG. 10B shows a partially deployed inflatable airbag with a first arm of the airbag cushion contacting the out-of-position occupant.
Figure 10C:
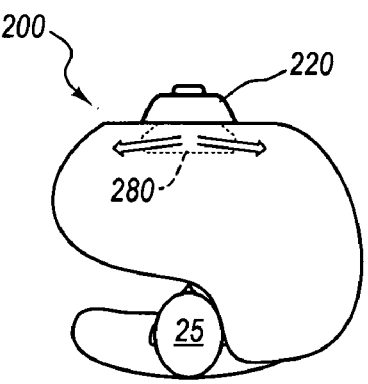
FIG. 10C shows a biased deployment of the inflatable airbag with an out-of-position occupant and the gas deflector shown in phantom.

FIGS. 10A-C illustrate various stages of a deploying airbag cushion 200 with obstruction in the deploying path. The occupant 25 is out-of-position and obstructs the unfolding of the first arm 260 and the second arm 270 during deployment of the airbag cushion 200, thereby causing a biased inflation of the airbag cushion 200. In FIG. 10A, the airbag cushion 200 begins initial deployment as in FIG. 9A. In FIG. 10B, the first arm 260 of the airbag cushion 200 impacts the occupant 25 thus causing the inflation gas to be redirected through the gas deflector 280 and at least partially detoured away from the first arm 260 and the inboard side of the airbag cushion 200. The detoured inflation gas flow can have less energy than the gas flow without an obstruction. FIG. 10C shows that the inflation of the airbag cushion 200 has been biased away from the out-of-position occupant. In this way, the airbag cushion 200 still provides protection to the occupant but the airbag inflation is restricted and the out-of-position occupant 25 receives less than the full punch-out loading of the airbag cushion 200 during deployment.

Certain implementations of the inventive method can be used to produce an airbag assembly with desirable inflation characteristics. For instance, in many of the above-described embodiments, the folding method employed causes one of the folded arms to deploy first, followed by the other folded arm and then the top portion and the bottom portion of the inflatable airbag. When one of the folded arms contact an obstruction during deployment, the deployment of the airbag will be biased to direct at least a part of the deployment energy away from the obstruction. The top and bottom portions of the airbag cushion will typically be the last portions to inflate.

Various embodiments of airbag cushions have been disclosed herein. The airbag cushions folded as disclosed herein are means for biasing the deployment of the airbag cushion during deployment with obstruction. The gas deflectors disclosed herein are means for diffusing inflation gas flow by re-directing inflation gas from an inflator when deployment of the airbag is obstructed. The airbag cushion housings disclosed herein are means for storing the folded airbag cushion.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims.

The invention claimed is:

1. A method of folding an inflatable airbag cushion for storage within a vehicle, wherein the airbag cushion in an unfolded state comprises a front side for contacting a vehicle occupant, and an underside opposite the front side, a top edge and a bottom edge both extending generally transverse to a longitudinal centerline of the airbag cushion, the bottom edge opposite the top edge, the method comprising:
   stowing the bottom edge;
   stowing the top edge;
      wherein stowing the bottom edge and stowing the top edge of the airbag cushion creates a first arm of the airbag cushion and a second arm of the airbag cushion, the first arm extending away from the second arm, and the first arm and the second arm extending generally transversely from the longitudinal centerline; and
   after stowing the bottom edge and the top edge, folding the first arm towards the longitudinal centerline of the airbag cushion and folding the second arm inwardly towards the longitudinal centerline of the airbag cushion, the first arm folded on top of the second arm,
      whereby during deployment without an obstruction, the first arm and the second arm do not contact the obstruction and the airbag cushion deploys normally; and
      whereby during deployment of the airbag cushion with an obstruction, the first arm contacts the obstruction while being deployed generally toward the center of the vehicle in an inboard direction before completely unfolding such that the inflation gas is at least partially detoured away from inflating the first arm to at least partially bias the deployment of the airbag cushion away from the obstruction as the second arm of the airbag cushion is deployed in an outboard direction generally away from the center of the vehicle.

2. The method of claim 1, wherein stowing comprises at least one of folding, rolling, or tucking.

3. The method of claim 2, wherein tucking comprises pushing the edge of the airbag cushion inwardly, between the front side and the underside of the airbag cushion to create at least one tuck along the edge of the airbag cushion.

4. The method of claim 1, wherein the inflatable airbag cushion comprises a gas deflector.

5. The method of claim 4, wherein the gas deflector is a loop diffuser configured to decrease punch-out loading during inflation of the airbag cushion and disperse the energy of the inflation gas during inflation when a vehicle occupant is out-of-position.

6. The method of claim 1, wherein the airbag cushion is attached to a housing.

7. The method of claim 6, wherein the airbag cushion is folded to be even with the boundaries of the housing.

8. A method of folding an inflatable airbag cushion for storage within a vehicle, the method comprising:
   locating the inflatable airbag cushion in a substantially unfolded state, wherein the airbag cushion comprises a front side for contacting a vehicle occupant, and an underside opposite the front side, a top edge and a bottom edge both extending generally transverse to a longitudinal centerline of the airbag cushion, the bottom edge opposite the top edge;
   stowing the bottom edge;
   stowing the top edge;
   wherein stowing the bottom edge and stowing top edge of the airbag cushion creates an inboard arm of the airbag cushion and an outboard arm of the airbag cushion;
   after stowing the bottom edge and the top edge, folding the inboard arm with a single fold towards the longitudinal centerline of the airbag cushion and folding the outboard arm with a single fold inwardly towards the longitudinal centerline of the airbag cushion, one arm folded on top of the other arm, such that during deployment of the airbag cushion the folded arms deploy towards a vehicle occupant and, upon deployment of the airbag cushion towards an out-of-position occupant, the top folded arm is configured to contact the out-of-position vehicle occupant before completely unfolding; and
   wherein the airbag cushion is configured to be attached to a housing and is in fluid communication with a gas generator.

9. The method of claim 8, wherein stowing comprises at least one of folding, rolling, or tucking.

10. The method of claim 9, wherein tucking comprises pushing the edge of the airbag cushion inwardly, between the front side and the underside of the airbag cushion to create at least one tuck along the edge of the airbag cushion.

11. The method of claim 8, wherein the inboard arm is the top folded arm and folded upon the outboard arm.

12. The method of claim 8, wherein the outboard arm is the top folded arm and is folded upon the inboard arm.

13. The method of claim 8, further comprising a gas deflector configured to decrease punch-out loading during inflation of the airbag cushion and disperse the energy of the inflation gas during inflation when a vehicle occupant is out-of-position.

14. An airbag module, comprising:
   an inflatable airbag cushion comprising, in an unfolded state, a front side for contacting a vehicle occupant, and an underside opposite the front side, a top edge and a bottom edge both extending generally transverse to a longitudinal centerline of the airbag cushion,
   wherein the bottom edge is opposite the top edge,
   wherein the bottom edge is stowed and the top edge is stowed,
   wherein stowing the bottom edge and the top edge forms a first arm and a second arm, and
   wherein the second arm is folded with a single fold towards the longitudinal centerline of the airbag cushion and the first arm is folded with a single fold towards the longitudinal centerline of the airbag cushion on top of the second arm at the final fold sequence of the inflatable airbag; and
   wherein during deployment of the inflatable airbag without an obstruction, the first arm and the second arm do not contact the obstruction and the inflatable airbag cushion deploys normally; and
   wherein during deployment with an obstruction, the first arm contacts the obstruction causing the inflation gasses to be at least partially detoured away from inflating the first arm, thereby at least partially biasing the inflation of the inflatable airbag cushion away from the obstruction.

15. The airbag module of claim 14, further comprising a gas deflector within the airbag cushion that is configured to direct the inflation gas flow.

16. The airbag module of claim 15, wherein the first arm is deployed in an inboard direction and the second arm is directed in an outboard direction.

17. The airbag module of claim 15, wherein the airbag cushion is attached to a housing, wherein the first arm and the second arm are symmetrically located with respect to the housing such that first arm and the second arm contact each other with similar lengths as the first arm rests on the second arm.

* * * * *